United States Patent [19]

Distler et al.

[11] Patent Number: 5,036,877

[45] Date of Patent: Aug. 6, 1991

[54] PILOT CONTROLLED PRESSURE RELIEF VALVE

[75] Inventors: Josef Distler, Lohr/Main; Albrecht Kessler, Wiesenfeld, both of Fed. Rep. of Germany

[73] Assignee: Mannesmann Rexroth GmbH, Lohr/Main, Fed. Rep. of Germany

[21] Appl. No.: 543,396

[22] Filed: Jun. 26, 1990

[30] Foreign Application Priority Data

Jun. 29, 1989 [DE] Fed. Rep. of Germany ....... 3921292

[51] Int. Cl.⁵ ............................................ G05D 16/10
[52] U.S. Cl. ................................. 137/489; 137/492.5; 137/493
[58] Field of Search ..................... 137/489, 492, 492.5, 137/493

[56] References Cited

U.S. PATENT DOCUMENTS

| 2,835,266 | 5/1958 | Morte . | |
|---|---|---|---|
| 3,373,763 | 3/1968 | Smilges | 137/489 X |
| 4,364,410 | 12/1982 | Chow | 137/493 X |
| 4,679,586 | 7/1987 | Riedel | 137/493 X |
| 4,865,074 | 9/1987 | Bickford | 137/489 |

FOREIGN PATENT DOCUMENTS

| 1271482 | 7/1963 | Fed. Rep. of Germany . |
| 7405538 | 9/1976 | Fed. Rep. of Germany . |
| 3448081 | 4/1988 | Fed. Rep. of Germany . |
| 3401369 | 5/1988 | Fed. Rep. of Germany . |

Primary Examiner—Alan Cohan
Attorney, Agent, or Firm—Emrich & Dithmar

[57] ABSTRACT

The invention refers to a pilot controlled pressure relief valve comprising a pair of fluid ports to be operable in both directions of flow. The pressure relief valve is provided with a single pilot control valve 24 which allows for an equal actuating pressure in both flow directions.

4 Claims, 1 Drawing Sheet

PILOT CONTROLLED PRESSURE RELIEF VALVE

The invention relates to a pilot controlled pressure relief valve operable by the pressure of a fluid which may flow through the valve in either direction.

The main piston of the main valve is formed as a differential piston defining a circular seat area and an annular area. The circular seat area is subjected to the pressure of the fluid flowing in a first flow direction and the annular area of the differential piston is subjected to the pressure of the fluid flowing in a second flow direction which is reverse to the first flow direction. The fluid pressure either acting on the circular area or on the annular area tends to open the fluid passage governed by the main piston.

BACKGROUND OF THE INVENTION

German patent 34 01 369 discloses a differential piston defining a circular area and an annular area each of which is part of a control chamber. Each control chamber communicates with a pilot valve. When the fluid pressure exceeds a predetermined pressure which is adjusted at each one of a pair of pilot valves, the main piston is actuated to open the fluid passage in either flow direction.

SUMMARY OF THE INVENTION

It is an object of the present invention to provide a pressure relief valve which is simple in structure and provides for an equal opening pressure in both flow directions.

According to the present invention the pilot controlled pressure relief valve operable in either one of two flow directions comprises a housing, a bore in said housing, a first and a second fluid port in said housing opening into said bore and a main piston forming a differential piston having a circular face defining a seating area of the valve and an annular face wherein the seating area is engaged by the pressure of the fluid flowing in a first flow direction and wherein the annular face is engaged by the pressure of the fluid flowing in a second flow direction which is reverse with respect to the first flow direction wherein the main piston includes a control chamber which is connected via a passage including a check valve with the first fluid port and via a further passage including a check valve with the second fluid port and that a control piston is subjected to the fluid pressure in said control chamber which control piston acts on the closure member of a single pilot valve to open said closure member when the pressure in the control chamber exceeds a predetermined pressure, thereby allowing the main piston to open the fluid communication between the first and second fluid port. Further features of the present invention become apparent from the sub-claims.

DETAILED DESCRIPTION

Figure 1:
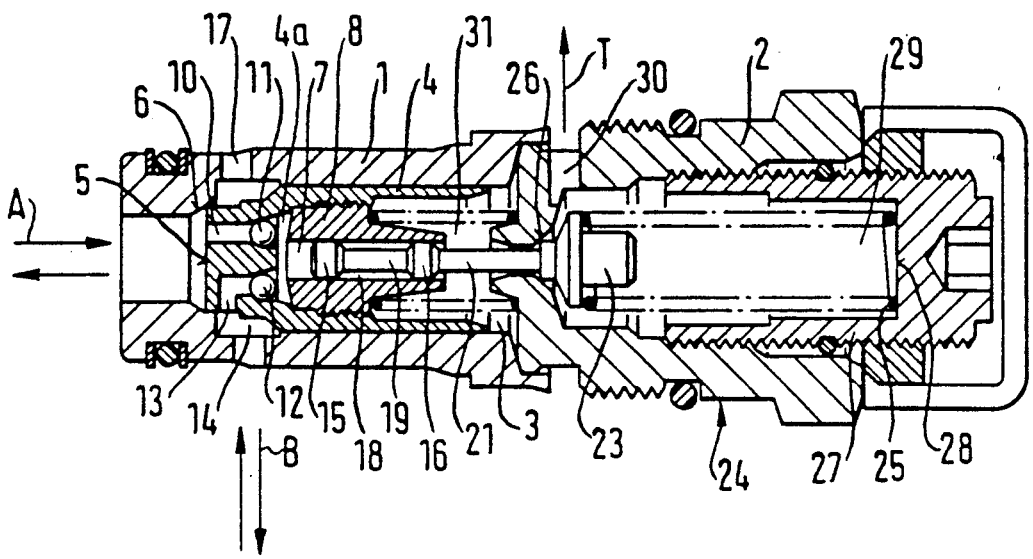
FIG. 1 is a transverse sectional view of a pilot controlled pressure relief valve constructed in accordance with the preferred embodiment of the present invention and FIG. 2 shows a graphic symbol of the valve according to FIG. 1.
Figure 2:
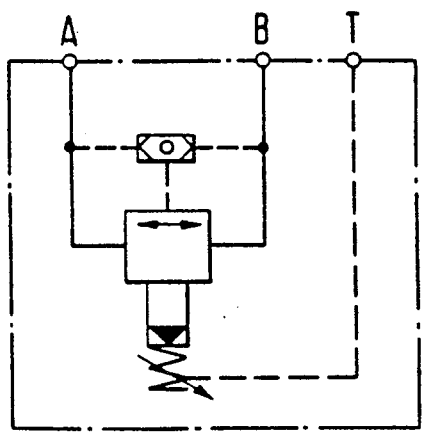

FIG. 1 shows a cartridge type valve comprising a sleeve-like casing 1 and an enclosure 2 which is mounted in an outer receiving housing not shown. The sleeve member 1 is provided with fluid ports A and B extending under an angle of 90°. The sleeve member 1 includes a longitudinal bore 3 slidably receiving a main valve piston 4 which is formed as differential piston comprising a circular area 5 which defines the seating area sealingly cooperating with a conical seating face 6 of the sleeve member 1 facing the fluid port A. The fluid port B opens into an annular chamber 14 adjacent the annular area of the differential piston 4. A control chamber 7 is provided in the main piston 4. The control chamber 7 is limited by a blind bore 4a in the main piston and an insert member 8. A passage 10 in the bottom of the main piston including a check valve 11 connects the control chamber 7 to the fluid port A and a bore 13 including a check valve 12 connects the control chamber 7 with the annular chamber 14 and the fluid port B via radial bores 17. Via the passages 10 and 13 and the check valves 11 and 12 the highest pressure either prevailing in fluid port A or fluid port B is supplied to the control chamber 7. This control pressure, engages a control piston 15 which is guided with play in a control bore 18 of the insert member 8. The piston 15 includes two distant piston lands 16, 19 and an extension rod 21 which acts on a closure member 23 of a pilot control valve 24. The closure member is urged in closing position towards a seat 26 of the casing 2 by an adjustable spring 25. The spring force acting to maintain the closure member in the closed position is determined by a threaded sleeve 27 which provides a support 28 for the spring. By screwing the sleeve 27 inwardly or outwardly the spring force is varied. The spring chamber 29 of the casing 2 communicates via a radial bore 30 with a reservoir.

The play of the piston lands 16 and 19 in control bore 18 of the insert member 8 defines throttling passages. Accordingly, when the closure member 23 is closed, the pressure in the control chamber 31 provided between the closure member 23 and the main piston 4 equals the pressure in the control chamber 7. As mentioned before the pressure in fluid port A or fluid port B whichever is higher prevails in the control chamber 7 and in the pilot control chamber 31 upstream of the closure member 23 via the throttling passages provided for by the piston lands 15 and 16. When the pressure in one of the fluid ports exceeds the pressure of the pilot valve 24 set for by the spring 25, the closure member 23 opens and the pressure in the control chamber 31 is relieved to the reservoir T. This results in a pressure drop across the piston 15 which maintains the closure member 23 in its open position until the pressure in either the fluid port A or B is reduced below the pressure set by the pilot control valve. This is true for both flow directions from fluid port A to fluid port B or respectively fluid port B to fluid port A.

We claim:

1. A pilot controlled pressure relief valve operable in either one or two flow directions, comprising a housing, a bore in said housing, a first and a second fluid port in said housing opening into said bore and a main piston forming a differential piston having a circular face defining a seating area of the valve and an annular face wherein the seating area is subjected to the pressure of the fluid flowing in a first flow direction and wherein the annular face is subjected to the pressure of the fluid flowing in a second flow direction which is reverse with respect to the first flow direction, the main piston includes a control bore and a control chamber, the control chamber being connected via a passage including a check valve with the first fluid port and via a further passage including a check valve with the second fluid port, a control piston slidably guided within the control bore with a predetermined play and subjected to the fluid pressure in said control chamber, and a single pilot valve having a closure member, said control piston acting on the closure member to open said closure member when the pressure in the control chamber exceeds a predetermined pressure, thereby allowing the main piston to open the fluid communication between the first and second fluid ports.

2. The pilot controlled pressure relief valve of claim 1, wherein the main piston accommodates an insert member having the control bore formed therein.

3. The pilot controlled pressure relief valve of claim 2, wherein the control piston includes a pair of lands and a piston rod acting on the closure member of the pilot valve.

4. The pilot controlled pressure relief valve of claim 2, wherein the play of the control piston in the control bore of the insert member defines throttling passages between the control chamber and a pilot control pressure chamber communicating with a reservoir via said closure member of the pilot valve.

* * * * *